(12) United States Patent
Shepard et al.

(10) Patent No.: US 9,697,649 B1
(45) Date of Patent: Jul. 4, 2017

(54) CONTROLLING ACCESS TO A DEVICE

(75) Inventors: Isaac J Shepard, Ladera Ranch, CA (US); Keela N Robison, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 13/603,245

(22) Filed: Sep. 4, 2012

(51) Int. Cl.
*G06T 15/00* (2011.01)
*G06T 19/20* (2011.01)

(52) U.S. Cl.
CPC .................................... *G06T 19/20* (2013.01)

(58) Field of Classification Search
None
See application file for complete search history.

(56) References Cited

U.S. PATENT DOCUMENTS

| | | |
|---|---|---|
| 4,430,004 A | 2/1984 | Nitschke |
| 6,593,942 B1 | 7/2003 | Bushmitch et al. |
| 8,237,655 B2 | 8/2012 | Yabe et al. |
| 8,522,163 B2 | 8/2013 | Relyea et al. |
| 8,526,675 B2 | 9/2013 | Ruan |
| 8,613,018 B2 | 12/2013 | Kim et al. |
| 8,627,236 B2 | 1/2014 | Jung et al. |
| 2003/0007420 A1 | 1/2003 | Shteyn |
| 2006/0034161 A1 | 2/2006 | Muller |
| 2006/0168545 A1 | 7/2006 | Niittynen et al. |
| 2008/0022365 A1* | 1/2008 | Chae ..................... G06F 21/32 726/2 |
| 2008/0186275 A1* | 8/2008 | Anderson ..................... 345/157 |
| 2011/0211754 A1 | 9/2011 | Litvak et al. |
| 2011/0261048 A1 | 10/2011 | Lee et al. |
| 2012/0056878 A1 | 3/2012 | Miyazawa et al. |
| 2012/0066629 A1 | 3/2012 | Lee et al. |
| 2012/0066648 A1* | 3/2012 | Rolleston ............ G06F 3/04815 715/849 |
| 2012/0084734 A1* | 4/2012 | Wilairat ................... G06F 21/36 715/863 |
| 2012/0154301 A1* | 6/2012 | Kang ................... G06F 3/04886 345/173 |

(Continued)

OTHER PUBLICATIONS

Vidya Mhaske-Dhamdhere, 3-D Graphical Password Used for Authentication, Mar.-Apr. 2012, International Journal of Computer Technology and Applications, vol. 2 isue 2, pp. 510-519.*

(Continued)

*Primary Examiner* — Barry Drennan
*Assistant Examiner* — Diana Hickey
(74) *Attorney, Agent, or Firm* — Athorus, PLLC

(57) ABSTRACT

This application describes, in part, system and methods for controlling access to a device, application or service available through a device. In some implementations, an access request may be received and a three-dimensional representation of an object presented on a display of the device that allows a user to provide a three-dimensional input pattern. The input pattern may traverse multiple surface areas of the graphical representation of the three-dimensional object and in some instances the graphical representation of the object may rotate as the input pattern is received. The input pattern may then be verified and access to the device either granted or denied.

30 Claims, 6 Drawing Sheets

(56) References Cited

U.S. PATENT DOCUMENTS

| | | | |
|---|---|---|---|
| 2012/0154378 A1* | 6/2012 | Kitchens | H04N 13/0468 |
| | | | 345/419 |
| 2012/0197998 A1 | 8/2012 | Kessel et al. | |
| 2012/0306876 A1* | 12/2012 | Shotton | G06T 17/10 |
| | | | 345/424 |
| 2013/0004016 A1 | 1/2013 | Karakotsios et al. | |
| 2013/0170324 A1 | 7/2013 | Tu et al. | |
| 2013/0235069 A1 | 9/2013 | Ubillos et al. | |
| 2014/0013414 A1* | 1/2014 | Bruck | G06F 21/36 |
| | | | 726/16 |

OTHER PUBLICATIONS

Empson, Rip, "Read Offline: News.me Automatically Downloads Your News Whenever You Leave Home", "TechCrunch", Apr. 22, 2012, pp. 2 Publisher: www.TechCrunch.com, Published in: US.
U.S. Appl. No. 12/180,325, filed Jul. 25, 2008, Narasimhan et al., "Communication Management based on Communication Events."
U.S. Appl. No. 13/352,087, filed Jan. 17, 2012, Zhou et al., "Managing Resource Usage for Task Performance."
U.S. Appl. No. 13/552,213, filed Jul. 18, 2012, Dong Zhou et al., "Custom Color Spectrum for Skin Detection.".

* cited by examiner

CONTROLLING ACCESS TO A DEVICE

BACKGROUND

People are increasingly interacting with computers and other electronic devices in new and interesting ways. With the continued increase of processing power and content stored on portable devices, there is a growing need for additional techniques to control access to the device, device applications and/or content on the device. Most devices allow users to add a password that must be input at an unlock screen to gain access to the device. However, with numerous passwords for different devices, credit cards and other user sensitive services, two problems have become prevalent. Either the user utilizes one password for most devices and services, which if breached provides access to a large amount of user sensitive information, or the user must maintain so many passwords for the different devices and services it becomes difficult to recall what password corresponds to which device or service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, systems and methods that may be used to control access to a device, applications within a device, and/or access to other services. In particular, various implementations may utilize one or more inputs to detect a user and provide access to the device or service. For example, a three-dimensional representation of an object may be displayed on a user interface. An input pattern may be developed and stored as an access pattern that includes one or more associations with different movements, points, positions, locations and/or surfaces on the three-dimensional object. Generally, an access pattern may be any series of movements, points, positions, locations and/or surfaces as represented by positions or coordinate values in three-dimensions (e.g., x, y, z).

When the input pattern is correctly provided by the user, access to the device or service is provided. For example, the three-dimensional representation of the object may be a cube and the access pattern may require moving a finger over portions of a touch-based display that visually represents multiple surface areas or sides of the cube. Those movements may be represented as a series of positions in the three-dimensional space with respect to the cube. When the input pattern is properly received in the right order and verified against a stored access pattern, access to the device or service may be provided.

The various input components for use in receiving input from a user may include a touch-based display (e.g., resistive, capacitive, Interpolating Force-Sensitive Resistance (IFSR)), camera (for facial tracking, gaze tracking, head tracking, feature tracking, expression recognition, facial recognition, light detection), accelerometer, gyroscope, inertial sensor, pressure sensor, microphone, a barometer, global positioning system (GPS), compass or any combination thereof. One or more of these input components may be included on a device or otherwise in communication with the device.

Figure 1:
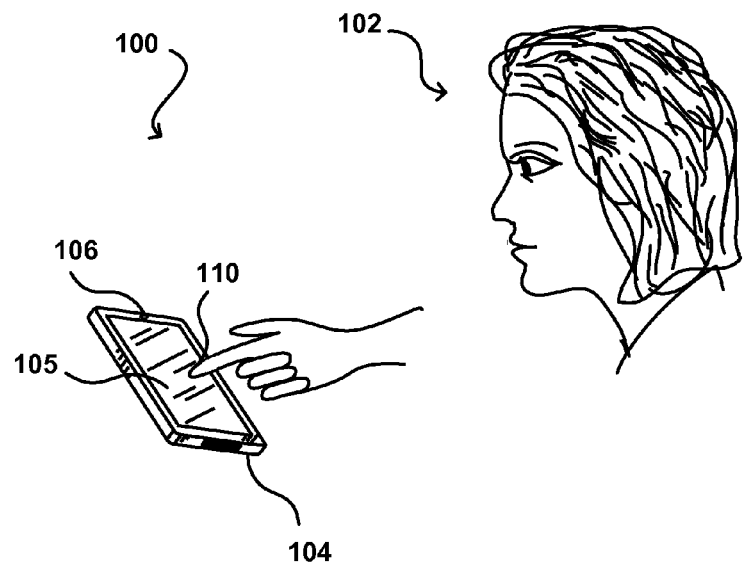
FIG. 1 illustrates an example environment in which various aspects can be used in accordance with various implementations.

FIG. 1 illustrates an example situation 100 wherein a user 102 would like to provide touch-, gesture- and/or motion-based input to a computing device 104 to access the device. Although a portable computing device (e.g., a smart phone, an e-book reader, or tablet computer) is shown, it should be understood that various other types of electronic devices that are capable of receiving and processing input can be used in accordance with various implementations discussed herein. These devices can include, for example, desktop computers, notebook computers, personal data assistants, cellular phones, video gaming consoles or controllers, and portable media players, among others. In this example, the computing device 104 has at least one camera 106 (e.g., a digital still camera, video camera, optical sensor, or other such image capture element) operable to perform image capture over an associated capture range. The camera may be capable of capturing information in both the visible light spectrum as well as other ranges of the electromagnetic spectrum. Each image capture element may be, for example, a charge-coupled device (CCD) or complimentary metal-oxide semiconductor (CMOS) sensor, for example, or can utilize another appropriate image capturing technology.

The computing device 104 may also include a touch-based display 105 operable to receive touch-based user input from a user of the device. The touch-based display 105 may receive touch-based inputs and determine the corresponding three-dimensional positions (x, y, z positions) of a user's input on a graphical representation on an object. In some implementations, ray casting or ray tracking may be used to cast a virtual ray from the point on the touch-based display into the scene to determine the x, y, z positions on the graphical representation of the object that correspond with the input. For example, if a user input is received through a touch-based display, the point on the display where the user is touching the display and a direction, such as perpendicular to the surface of the display, may be used to construct a ray that is virtually cast into the scene and onto the object to determine the x, y, z positions on the graphical representation of the three-dimensional object. Likewise, if the input is received from a camera and processed to provide gaze tracking, a ray may constructed based on the point on the display where the user is looking and a direction extending into the scene from the user's eyes (e.g., the center point between the user's eyes) through that point on the display. In such an example, the direction of the ray may not be perpendicular to the surface of the display. If the input is head tracking, a ray may be constructed based on a point on the display (e.g., the center of the display) and a direction extending into the scene from a point on the user's head through the point on the display. Similar to gaze tracking, the direction of the virtual ray may not be perpendicular to the display surface. It will be appreciated that other techniques may be used to determine positions (x, y, z) on a graphical representation of an object presented on a two dimensional display.

In this example, the user 102 is performing a selected motion or gesture on the touch-based display 105 using the user's fingertip 110 to provide an input that is used to form an input pattern. The motion can be one of a set of motions or gestures recognized by the device to correspond with a particular input or action, or can be a specific motion, pattern or gesture associated with that particular user. As used herein, an "input pattern" is a series of one or more inputs determined based in information received via an input component. An "access pattern" is a stored series of one or more previously provided input patterns used to verify and control access to a device. In some instances, an access pattern may only require verification of a single input pattern. For example, an access pattern may require a touch-based input pattern that includes a series of movements or gestures received via a touch-based display that corresponds with segments, points, positions and/or surfaces of a graphical representation of an object. In other implementations, the access pattern may require verification of multiple input patterns received from multiple input components.

Returning to the example of FIG. 1, as a user input is received from the touch-based display 105, the device 104 can analyze the input and form an input pattern using a pattern matching algorithm to determine whether the input pattern corresponds with a stored access pattern (which in this example only requires verification of the touch-based input pattern).

In other implementations, rather than forming the input pattern based on input from the touch-based display 106, the image capture device 106 may capture images that are processed to identify an input pattern, such as a gesture or motion, gaze tracking, head tracking, feature tracking, or expression recognition. In this example, the user 102 may move their eyes between different points on the display 105. Using at least one of the cameras 106 on the device, the device can capture image information including at least a portion of the eye motion, analyze the image information using at least one image or video analysis algorithm, and determine movement of the user's eyes (gaze tracking) between subsequent frames. In addition, a ray casting algorithm may be used to virtually cast a ray in the direction of the user's determined gaze and identify the corresponding pixel(s) of the graphically represented object to determine the three positions (x, y, z positions) of the input with respect to the object. Such detection may be used to form a corresponding input pattern and determine if that input pattern matches or corresponds with the stored access pattern.

In some implementations, an input pattern, such as motion across different segments/surfaces of a visual representation of a three-dimensional object, may be based on input received from different input components. For example, the input pattern may be formed based on input received through the touch-based display as a touch-based input pattern, through a camera as an image-based input pattern or through an accelerometer as an orientation-based input pattern. Regardless of the input component used or the input type received, in some implementations, the input pattern may be verified and correspond with the same stored access pattern. In other implementations, the access pattern may require that the input be received from a specific input component or be a specific type of input.

In some instances, having a single camera or only a touch-based display on the device might be insufficient to provide all the desired input to the device for various input and/or access patterns. For example, certain access patterns might require the input pattern include a distance-dependent component such that a single camera might not be sufficient to provide the necessary distance information, at least without complicated image analysis algorithms. Using two or more cameras can provide depth information, which can enable the relative positions of objects near the device to be determined in three dimensions. Similarly, each camera may have a specific field of view, such that only having one or two cameras on the device might limit the ability of the device to capture input patterns in all or most directions around the device. Similarly, a single light source (e.g., LED) may provide illumination over a specific range of angles and may not provide adequate lighting in multiple directions.

Figures 2A, 2B:
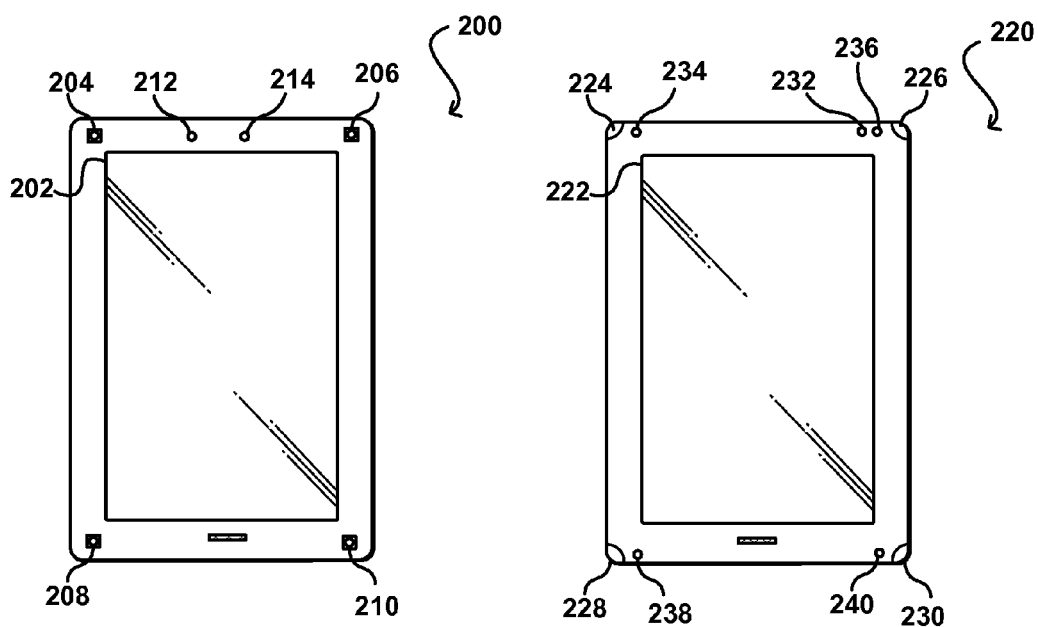
FIGS. 2(A) and 2(B) illustrate example device configurations that can be utilized in accordance with various implementations.

FIG. 2(A) illustrates a first example device 200 including multiple components that can be used to capture various types of input for use in forming input patterns, in accordance with different implementations. It should be understood that, while the components of the example device are shown to be on a "front" of the device, there can be similar or alterative components on the sides or back of the device as well (or instead). Further, directions such as "top," "side," and "back" are used for purposes of explanation and are not intended to require specific orientations unless otherwise stated. In this example device 200, there are four cameras 204, 206, 208, 210 on a same side of the device as a display 202 (e.g., an LCD display screen). Using such an arrangement, the device likely will have at least one or two cameras facing the user at any time that are unobstructed by objects, such as by the user holding the device, which can at least partially obscure a view of at least a portion of the user to various cameras on the device. The display 202 may be a touch-based display. In at least some implementations, the display provides for touch or swipe-based input using, for example, capacitive or resistive touch technology.

In this example, the device 200 also includes an illumination element 212 operable to project illumination (e.g., white light or IR) in the direction of the user, to assist with image capture. The device also includes a light sensor 214 for use in determining when illumination might be needed.

FIG. 2(B) illustrates another example device 220 wherein the cameras 224, 226, 228, 230 are positioned on the corners of the device. If the devices have a sufficient wide-angle lens (e.g., a fish-eye lens), the cameras can have at least partially overlapping fields of view such that the cameras might be able to capture input from substantially any direction around the device. In this example, each camera also has an associated illumination element 234, 236, 238, 240 operable to direct light over a range of angles associated with a respective camera. Although the illumination elements are shown on the front of the device for convenience, it should be understood that the illumination elements can be on the corners of the device as well, and in at least some implementations can utilize the same wide-angle lenses to project light over a range of angles at least including the field of view of the respective camera. This example device can also include a display 222, light sensor 232, and other such elements as discussed elsewhere herein. The display screen 222 may be a touch-based display. In at least some implementations, the display screen provides for touch or swipe-based input using, for example, capacitive or resistive touch technology.

As discussed, an advantage of having a large number of cameras, illumination elements, touch-based displays and other such input components is that input patterns can be captured in a number of different directions with different inputs and input types without significant concern about obstructions or other such occurrences. In addition to cameras and touch-based input, as discussed below, the devices may also include a variety of other input components, such as an accelerometer, gyroscope, inertial sensor, pressure sensor, microphone, a barometer, a global positioning system (GPS), a compass, and the like With the various types of input components, a user may establish an access pattern that is stored on the device and/or at a remote location that can be used to verify an input pattern and control access to the device and/or applications and services available through the device. In some implementations, a single input component may be used for creating and storing an access pattern. For example, as discussed below with respect to FIG. 3, a touch-based display may be used to present a three-dimensional representation of an object and an input formed based on a users input, associated with different positions, surfaces or points on the three-dimensional object and stored as an access pattern for use in verifying subsequent input patterns and controlling access to the device and/or services available through the device.

In other implementations, input from multiple input components may be used in combination to create an access pattern. For example, an access pattern may require a touch input from a touch-based display, an orientation input from a gyroscope and directional input from a compass. An access pattern may also require that the input patterns formed from multiple input components be provided in a particular order or sequence. For example, the access pattern may require that the input pattern from the touch-based display be received first, followed by the input pattern from the gyroscope and finally the directional input pattern from the compass. In such an example, each input pattern itself may be verified as well as the order in which the input patterns are received. Alternatively, the access pattern may require that two or more of the input patterns be provided in parallel. For example, the access pattern may require that the device be oriented in a Northern direction (direction input pattern) while an audio input pattern (e.g., audible password) is received from an audio input component.

In other implementations, the access pattern may not require an order or sequence for receiving input patterns from multiple input components. For example, an access pattern may require an image input pattern that uses gaze tracking to process eye movement, a touch-based input pattern received from a touch-based display input component, and an audio input pattern received from an audio input component (e.g., a microphone). In such implementations, only verification that each of the input patterns has been correctly received is necessary and the order in which they are received is not considered.

In other implementations, the access pattern may specify the input component and/or type of input that is to provide the input pattern. For example, if different segments of a graphical representation of a three-dimensional object are to be traversed, the access pattern may require that the input pattern to be verified be received from the touch-based display. In other implementations, the access pattern may require that the input pattern traversing the graphical representation of the three-dimensional object be received from the touch-based display input component in the form of a touch-based input or the camera input component in the form of a visual input that includes gaze tracking.

In still other implementations, the access pattern may further consider a time delay as part of the input pattern received from an input component and/or as part of the access pattern. For example, if the access pattern requires a touch-based input pattern received from a touch-based display, the touch-based input pattern may include a time delay during which a user may maintain the input (e.g., finger) at a stationary position on the touch-based display. Likewise, if the access pattern requires input patterns from multiple input components, a delay between the input patterns from the multiple input components may be considered part of the access pattern. For example, the access pattern may require a touch-based input pattern followed by a two-second delay before the device is rotated horizontally as detected by the electronic gyroscope (an orientation input pattern).

In some implementations, the access pattern may require depth information or information in three-dimensional space, such that two cameras should be used to provide stereo vision. For some devices, this could instead involve one camera and a distance sensor where the device includes a distance sensor and it is determined that the one camera/sensor approach consumes fewer resources than a stereo camera approach while providing sufficient performance. As discussed above, an image recognition process (or other process discussed herein) can be used to determine which hand the user is using to provide the input pattern and/or hold the device, which can affect selection of the cameras. Similarly, the device can attempt to determine whether the device is being held, in motion, or otherwise in an orientation that dictates which cameras should be used to capture the gesture information. For stereo image capture, a relative orientation and/or separation of the two cameras might be needed to provide the desired stereo effect (or at least provide sufficiently overlapping fields of view). Various other processes and information can be used as well.

The device can also attempt to determine whether illumination will likely be needed and if so, how many (and which) LEDs should be activated. If the recognition approach uses IR radiation, it can be determined that at least one IR LED will likely be needed to provide for adequate gesture detection. If ambient or visible light is to be used, a mechanism such as a light sensor (or information from one of the cameras, etc.) can be used to determine the amount of light in the vicinity of the user or device to determine whether (and how much) illumination will be needed. In some implementations, a single LED with a relatively low brightness setting can be used initially where the brightness can be increased until a maximum value is reached and then additional LEDs utilized until sufficient performance is obtained. In other implementations, the device can look at information such as the amount of ambient light, the distance and location of the user's hands or other features, historical performance data, and other such information to attempt to predict the minimum amount of illumination that should be provided to allow sufficient performance for receiving an input pattern under the current conditions. The selection of which LEDs to use can be based at least in part upon which cameras are selected, which access pattern is being used to verify the input pattern, the relative position and/or orientation of the user with respect to the device, and other such information.

The operational state of various input components can be selected as well using various algorithms discussed and suggested herein. For example, some access patterns only require receiving input from a touch-based display, or only require input from one camera and a compass. For such an access pattern, the system may activate only the display, or only the camera and the compass.

With the variety of access patterns that may be created using either a three-dimensional representation of an object on a display and/or input patterns from multiple input components to create an access pattern, access control to the device and/or services offered by the device may be greatly enhanced. In addition, sequence and/or motion based input patterns are generally easier to recall than are number based passwords.

Figure 3:
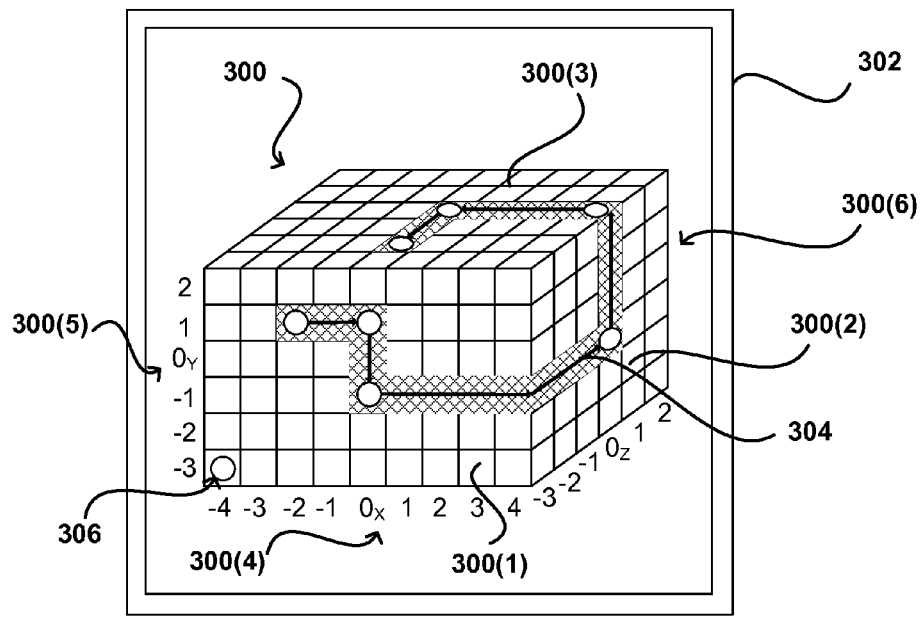
FIG. 3 illustrates a block diagram of a graphical representation of a three-dimensional object presented on a display of a device, according to various implementations.

FIG. 3 illustrates a block diagram of a graphical representation of a three-dimensional object 300 on a two-dimensional display 302 of a device for creating an access pattern and/or receiving an input pattern, according to various implementations. In some implementations, a user may create one or more access patterns and/or select the three-dimensional object with which the access pattern is associated. For example, a user may select the three-dimensional object of a cube 300 which has six surface areas, surface area 1 300(1), surface area 2 300(2), surface area 3 300(3), surface area 4 300(4), surface area 5 300(5), surface area 300(6), each surface area segmented into a series of input points defined by the x, y, z positions or coordinates.

A user may trace any pattern on the surfaces of the cube that may then be stored as the user's access pattern. As noted above, if the input is from the touch-based display the point the user is touching and a direction, such as perpendicular to the display surface, may be used to construct a ray that is virtually cast into the scene to identify the x, y, z positions on the graphical representation of the cube that correspond with the input. In some implementations, the access pattern may be stored as a series of surface area, position combinations and whether connections exist between the input points. For example, a user may provide an input pattern that includes placing their finger on surface area 1 300(1) of the cube 300 at input point (−2, 1, −3), moving their finger across the graphical representation of the cube 300 to surface area 1 300(1) input point (0, 1, −3), moving their finger down to surface area 1 300(1) input point (0, −1, −3), over to surface area 2 300(2) input point (4, −1, 0), up to surface area 3 300(3) input point (4, 2, 0), over to surface area 3 300(3) input point (0, 2, 0), then to surface area 3 300(3) input point (0, 2, −2) and finally lifting their finger and touching surface area 1 300(1) input point (−4, −3, −3) 306. This example user's input pattern, which includes input pattern 304 and input point 306, may be stored as an access pattern as follows: 1(−2, 1, −3), 1(0, 1, −3), 1(0, −1, −3), 2(4, −1, 0), 3(4, 2, 0), 3(0, 2, 0), 3(0, 2, −2) −1(−4, −3, −3).

In addition to identifying the graphical representation of the object to use and the access pattern, a user may specify the input component(s) from which the input pattern may be received, whether the graphical representation of the object is to rotate as the user provides the input pattern, whether the input pattern is to be visually represented as it is provided by the user, and the like. For example, a user may specify that the input pattern to be verified against the access pattern discussed with respect to this FIG. 3 is to be received from the touch-based display input component, the camera, or either.

For object rotation, the user may specify that as the input pattern traverses from one area of the graphical representation of the object to another (e.g., from surface area 1 300(1) to surface area 2 300(2)), the graphical representation of the object should rotate so surface area 2 300(2) is more visible to the user and/or so additional surface areas of the object are visible to the user. In some implementations, it may be required that the access pattern traverse at least two surface areas of the three dimensional representation of the object, while in other instances only one surface area need be traversed. In addition, in some implementations, the graphical representation of the object may be animated as it rotates.

It will be appreciated that any graphical representation of a three dimensional object may be used with various embodiments described herein and a three-dimensional representation of a cube is merely provided for explanation purposes. For example, rather than a cube, a three-dimensional representation of a pyramid, star, sphere, cone or any other object may be utilized.

The access patterns may be used to control access to the device itself, control access to one or more applications or services available through the device, and/or to control access to a specific application or service available through the device. For example, a user may establish one access pattern for use in obtaining general access to the device (e.g., unlocking the device and providing the main screen or "home screen"), a second access pattern for obtaining access to sensitive or secure information available through the device (e.g., providing access to personal information, user settings, financial information) and a third access pattern for use in obtaining access to the device and a particular application or set of applications available through the device (e.g., unlock the device and provide access to a social networking site). In establishing one or more access patterns, a user may identify one or more input components that are to be used in receiving input and forming input patterns, whether the sequence in which those inputs are received is to be considered part of the access pattern and/or whether a time component is also to be considered as part of the access pattern.

In addition to a single user having multiple access patterns, in some implementations, multiple users may have one or more access patterns for controlling access to the same device and/or for controlling access to the same or different applications or services available through the same device.

Figure 4:
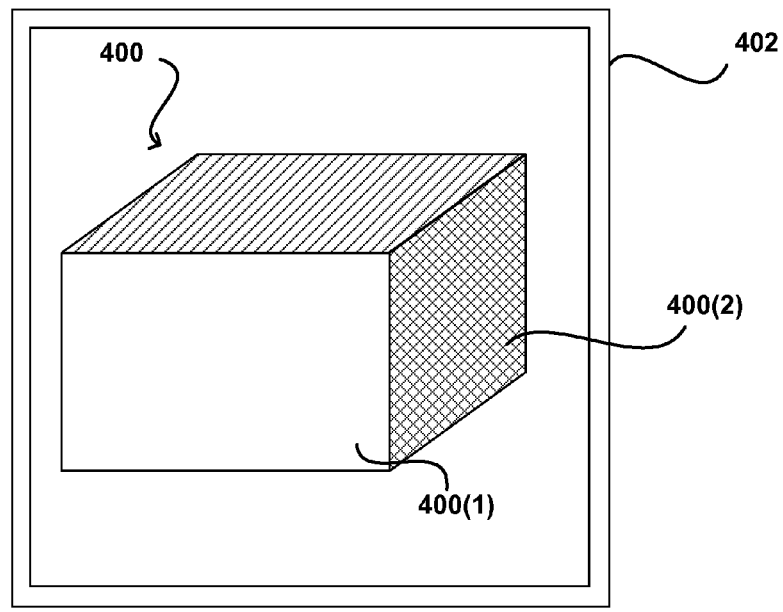
FIG. 4 illustrates a diagram of a graphical representation of a three-dimensional object presented on a display, according to various implementations.

For multiple access patterns for the same user or one or more access patterns of multiple users, the same or different graphical representations of a three dimensional object may be used. In some implementations, different surface areas of a graphical representation of a three dimensional object may be used as a starting point for different access patterns. The different surface areas may have different images or different representations to aid a user in identifying which surface area of the three-dimensional object is the starting point for the different patterns. For example, FIG. 4 illustrates a block diagram of a graphical representation of a three-dimensional object 400 presented on a display 402. The different surface areas of the object 400 may include different images or identifiers to aid a user in identifying a starting point for one or more access patterns. For example, a single user may have multiple access patterns; one access pattern to provide access to work related content, one for personal content, one for games and one for news. The graphical representation of an object may include user selected graphical identifiers on different surface areas of the object to aid in determining which surface area of the object to initiate an input pattern. For example, surface area 1 400(1) may include an image of the users office or work related documents as an aid in determining that the input pattern for work related applications is to begin on surface area 1 400(1) of the graphical representation of the object. Surface area 2 400(2) may include an image of the user to aid the user in determining that the input pattern for personal content is to begin on surface area 2 400(2), and so forth.

Similarly, one or more of the surface areas may correspond to a different user. For example, surface area 3 400(3) may have an image of the user's son or a toy to remind both the user and the user's son that the input pattern for the user's son to access the device begins on surface area 4 400(4). In some instances, multiple users may have access patterns that start and/or traverse the same surface areas of a graphical representation of the object. Also, depending on where an input pattern begins, images on other surface areas of the graphical representation of the object may change as the input pattern traverses the graphical representation of the object.

Figure 5A:
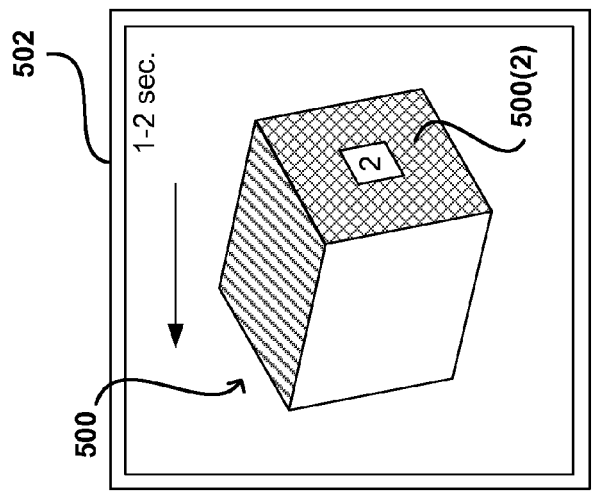
FIGS. 5(A)-5(C) illustrates an example process for providing an input pattern for a device, in accordance with various implementations.
Figure 5B:
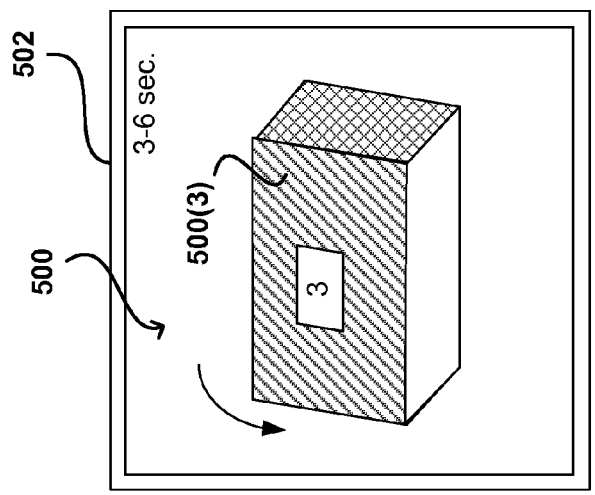
Figure 5C:
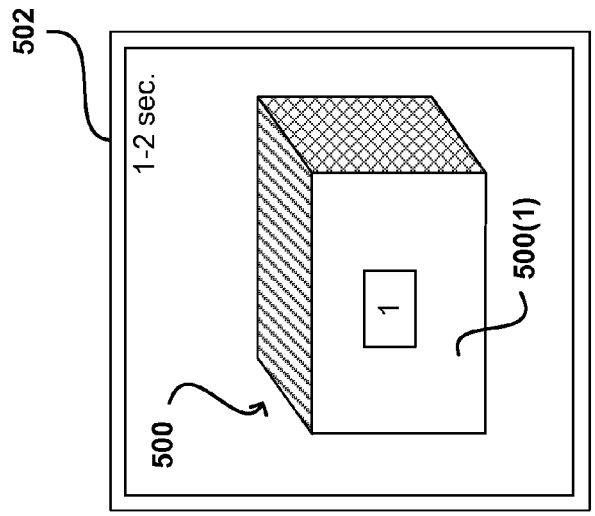

FIGS. 5(A)-5(C) illustrate another example process for providing an input pattern, in accordance with various implementations. In this example, an access pattern has been specified that requires input patterns be received from a camera and processed to provide head tracking or received from an accelerometer that detects position movement of the device in the x, y, z directions. As a user provides an input by either moving their head or moving the device, a three-dimensional representation of an object is graphically rotated on the display 502 of a device as if the user was moving their head around a real object. As discussed above, the users head may be tracked and a ray casting or tracing algorithm used to virtually cast a ray from a point on the user's head into the device to identify which surface of the three-dimensional object the user is viewing. Based on the ray casting information, an input pattern may be formed and the graphical representation of the object may be rotated. In some implementations, the rotation may be animated.

In this example described with respect to FIGS. 5(A)-5(C), a user starts by looking face on at surface area 1 500(1) of the object, moving their head upward with respect to the device so they appear to be looking down at the top of the object, surface area 3 500(3), then moving their head to the right of the device as if they were looking at the right side of the object, surface area 2 500(2). As the user moves their head or the device, the graphical representation of the three dimensional object 500 rotates on the display accordingly. When the user is looking face on at the device a virtual ray is cast from a point on the user's head, directly into the device. When the user moves their head upward and looks down at the device, the ray is virtually cast in a downward direction into the device from the new position of the user's head. This information may be used assist in determining the direction and amount of rotation for the graphical representation of the three-dimensional object.

In addition to forming an input pattern based on head tracking or device movement, the access pattern corresponding with the example provided in FIG. 5 includes a time delay between each movement. For example, at the start of the input, the user must hold the first position, which provides a representation that the user is looking at surface area 1 500(2), for approximately 1-2 seconds, move to the second position, which provides a representation that the user is looking at surface area 3 500(3), and hold that position for 3-6 seconds and finally move to position three, which provides a representation that the user is looking at surface area 2 500(2), and hold that position for 1-2 seconds.

The input pattern of head movement between positions and the time delays between positions may be received and verified against a stored access pattern to control access to the device and/or services offered through the device. If the received input pattern corresponds with the stored access pattern, access is granted. Otherwise, access is denied.

Figure 6:
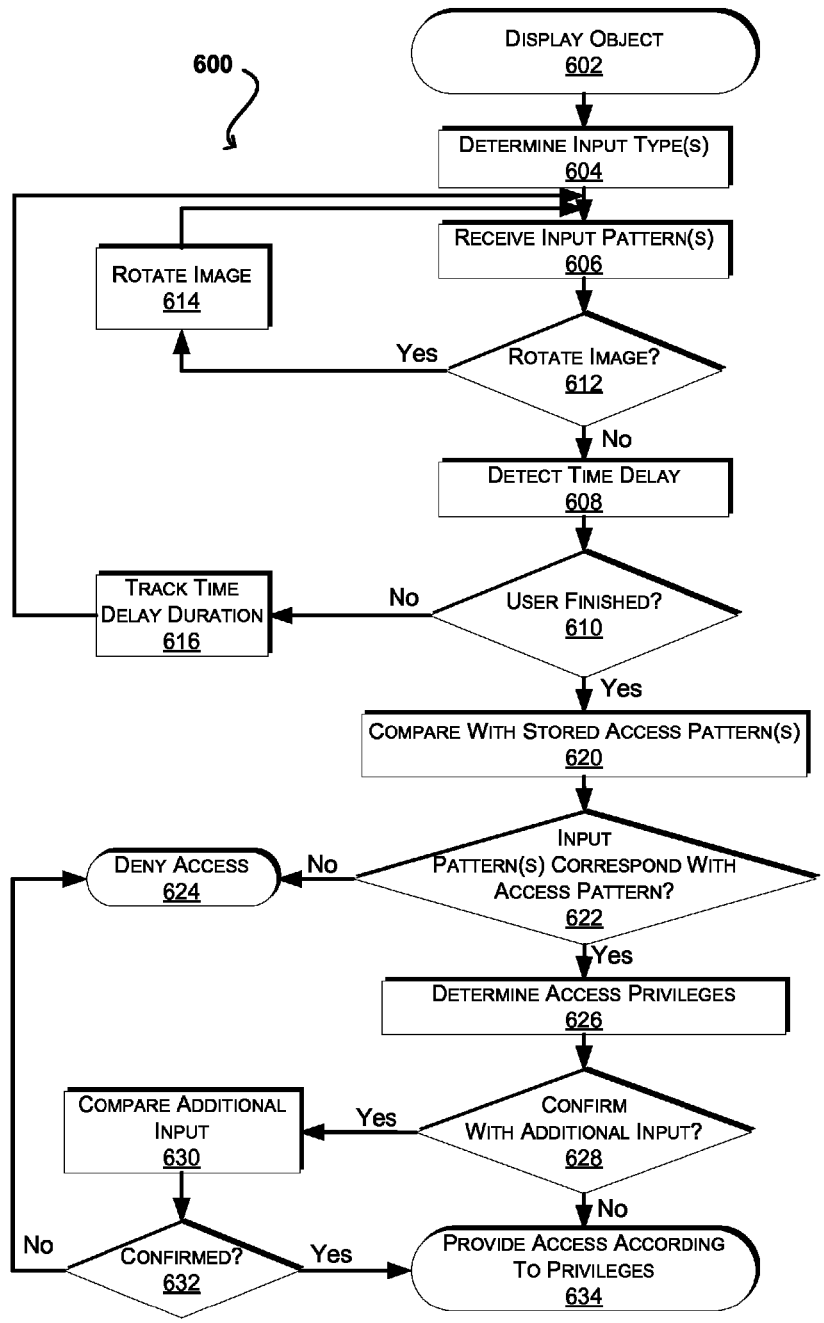
FIG. 6 is a flow diagram of an example process for receiving an input pattern(s) and controlling access to a device.

FIG. 6 is a flow diagram of an example process 600 for receiving an input pattern(s) and controlling access to a device. The example process 600 may be initiated by a user requesting to access the device or a service available through the device for which access control has been established. An access request may be provided using any input component of the device. For example, an access request may be received through a touch based display, camera input (e.g., head tracking, gaze tracking, feature tracking), a microphone, button, accelerometer, gyroscope, or any other input component capable of receiving input from the user.

Upon receiving an access request, the example process 600 may display a three-dimensional representation of an object on a display of the device, as in 602. As discussed above, the three-dimensional representation of an object may be an object identified or otherwise specified by the user of the device for use in providing an input pattern. The object may be any object that can be used to receive an input pattern that includes three dimension values or positions (e.g., x, y, z).

In addition to displaying a graphical representation of a three-dimensional object, the input type(s) and/or input components to be used may also be determined, as in 604. In some implementations, a user may identify the input type and/or input component(s) that may be used for receiving inputs and forming input pattern(s). In some implementations, only a single input component may be identified for use in receiving inputs. Alternatively, multiple input components may be used to provide multiple input patterns that are verified against a stored access pattern. Likewise, in some implementations, multiple different input types and/or input components may be used to provide an input pattern that may be compared against a stored access pattern.

In some implementations, to determine the input types to be used, a camera may be activated and an image of a user that has requested access may be captured and analyzed (e.g., facial recognition) to preliminarily identify the user, determine the stored access pattern(s) that correspond with the identified user and select the input types and/or input components relevant for those access patterns. As discussed above, to conserve processing power and/or battery life, only the input components for which input patterns are to be received may be activated as part of the example process 600.

Upon activating the one or more input components, the example process 600 may receive the input pattern(s), as in 606. The input patterns may be received and processed as a series of positions in a three-dimensional space. For example, ray casting may be used to determine the x, y, z positions of the input as it corresponds to the graphical representation of the three dimensional object based.

As part of receiving the input pattern(s), a determination may be made as to whether the three-dimensional representation of the object presented on the display is to be rotated, as in 612. If it is determined that the representation of the object is to be rotated while receiving the input pattern(s), the three-dimensional representation of the object is rotated, as in 614. In some implementations, a three-dimensional representation of an object may be rotated as an input pattern traverses from one surface of the three-dimensional representation of the object to a different surface. In other examples, a three-dimensional representation of an object may be rotated based on a user's tracked head position, gaze tracking, position or orientation of the device, input from an accelerometer, gyroscope, compass, and the like. As the representation of the object is rotated, the example process 600 may continue to receive the input pattern(s).

At some point during receipt of the input pattern(s), a time delay may be detected, as in 608, and a determination made as to whether the user has finished providing input (s), as in 610. Determining whether a user has finished providing input (s) may be done based on expiration of a maximum time, by the user selecting a submit or finish control, or through other means. For example, a maximum time may be set to ten-seconds and upon expiration of that maximum time if no additional inputs have been received it may be determined that the user has finished providing input(s).

If it is determined that the user has not finished providing input(s), the duration of the time delay may be tracked, as in 616. In some implementations, the time delay may be part of an input pattern and/or part of an access pattern. For example, an input pattern may include a user maintaining gaze in a stationary position for five-seconds as part of the input pattern received from a camera. In general, the tracked time delay duration may be considered part of an input pattern or part of a time delay within an access pattern. For example, the access pattern may require a time delay of 3-5 seconds between receiving an input pattern from a camera and receiving an input pattern from a touch-based display.

If it is determined that the user has finished providing input(s), the received input pattern(s) are compared with the stored access pattern(s), as in 620. Comparing the received input pattern(s) with a stored access pattern may include identifying one of multiple access patterns stored on the device. Identifying the appropriate access pattern for verification may be done in an iterative process by first identifying stored access patterns that require the same input types or use of the same input components as used to receive the input pattern(s). If multiple stored access patterns require use of the same input types and/or input components, a determination may be made as to whether those access patterns require that the input pattern(s) be received in a particular sequence or order. Any access patterns that require receipt of input patterns in a particular sequence or order that do not match the sequence or order in which the input patterns were received may be eliminated from consideration. The input patterns received may then be verified against the remaining access pattern(s).

Upon comparing the input pattern(s) with the potentially matching stored access pattern(s), a determination may be made as to whether the received input pattern(s) correspond with the stored access pattern(s), as in 622. If it is determined that the received input pattern(s) does not correspond with any of the stored access patterns, the requested access is denied, as in 622. However, if it is determined that the received input pattern(s) does correspond with a stored access pattern, in some implementations, the example process 600 may determine access privileges associated with the matching access pattern, as in 626. Access privileges may be any level or control as to what components, applications and/or services available through the device may be made available to the user.

In addition to determining access privileges, a determination may be made as to whether additional input should be confirmed prior to granting access, as in 628. In establishing an access pattern, in some implementations, a user may specify whether additional forms of input are required beyond verification of an input pattern(s). For example, in addition to verifying an input pattern(s), the example process 600 may also perform additional user identification verification, such as facial recognition, biometric identification, and the like. Such additional verification may be directly provided by the user (biometrics) or obtained by the device (facial recognition) without active user involvement. In some examples, the additional verification may be obtained and processed prior to or in parallel with the user providing an input pattern(s). For example, if one of the input patterns is to be received from a camera for processing to determine gaze tracking, the captured images may also be used to perform facial recognition of the user providing the input pattern.

If it is determined that additional input is to be confirmed, the example process 600 may compare the additional input with stored verification information, as in 630, and a determination may be made as to whether the additional input is confirmed, as in 632. If it is determined that the additional input is not confirmed, the requested access may be denied, as in 624. However, if it is determined that the additional input is confirmed, or if it is determined at decision block 628 that additional confirmation is not necessary, the example process 600 may provide access to the device or one or more services available through device according to the determined access privileges, as in 634.

Figure 7:
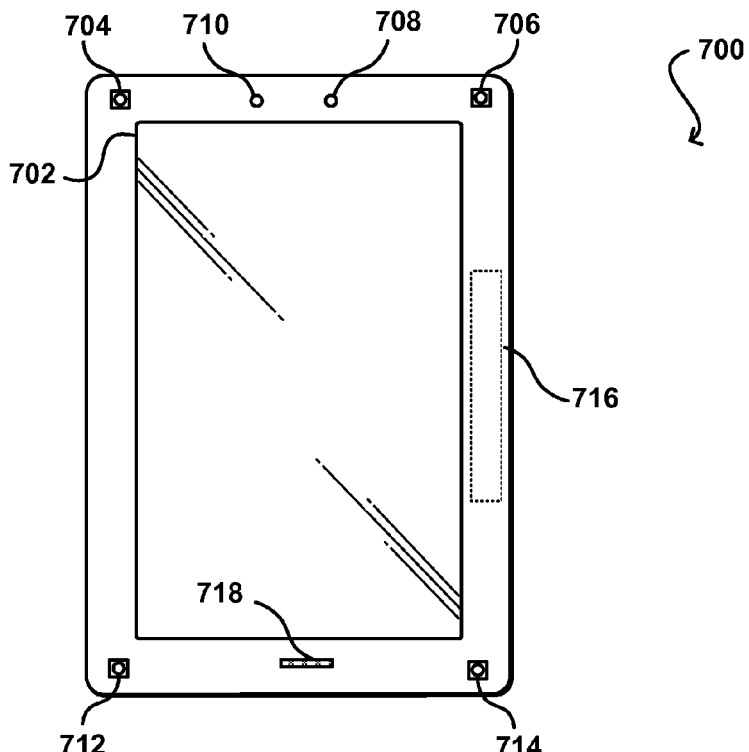
FIG. 7 illustrates an example computing device that can be used in accordance with various implementations.

FIG. 7 illustrates an example computing device 700 that can be used in accordance with various implementations. In this example, the device has at least four conventional digital cameras 704, 706, 712, 714 on a same side of the device as a display element 702, enabling the device to capture image information for a user of the device during typical operation where the user is at least partially in front of the display element, and thus at least partially within the field of view of at least some of the cameras. In addition, there is at least one illumination element 708 (e.g., a white light or IR LED) positioned on the same side of the device such that an object captured by one of the cameras can be at least partially illuminated by the illumination element(s). This example device may also include a light sensor 710 that can be used to determine an amount of light in a general direction of an image to be captured and a microphone 718 for capturing audio information. The device also includes at least one orientation-determining component 716, such as an accelerometer, compass, inertial sensor, or electronic gyroscope, operable to determine motion or orientation of the device. Various other input components and combinations of input components can be used as well within the scope of the various implementations as should be apparent in light of the teachings and suggestions contained herein.

Figure 8:
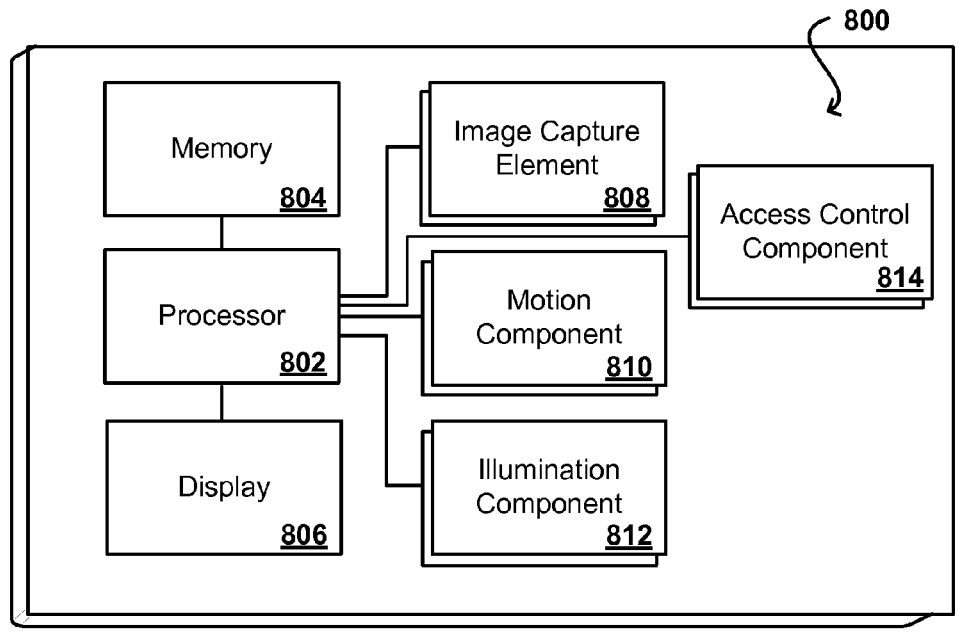
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802. The same or separate storage can be used for images or data and a removable storage memory can be available for sharing information with other devices, etc. The device typically will include some type of display element 806, such as a touch-based display, electronic ink (e-ink), organic light emitting diode (OLED) or liquid crystal display (LCD), although devices such as portable media players might convey information via other means, such as through audio speakers. In at least some implementations, the display screen provides for touch or swipe-based input using, for example, capacitive or resistive touch technology.

As discussed, the device in many implementations will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can include at least one motion component 810, such as an accelerometer, compass, inertial sensor, or electronic gyroscope, operable to detect changes in the position and/or orientation of the device. The device also can include at least one illumination element 812, which may include one or more light sources (e.g., white light LEDs, IR emitters, or flash lamps) for providing illumination and/or one or more light sensors or detectors for detecting ambient light or intensity, etc. The device can also include at least one access control component 814 that stores one or more access patterns, access privileges for different users and compares received access patterns with stored access patterns to determine whether access to the device and/or applications of the device should be allowed or denied.

The example device can include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through a combination of visual (e.g., gesture) and audio (e.g., spoken) commands such that a user can control the device without having to be in contact with the device.

Figure 9:
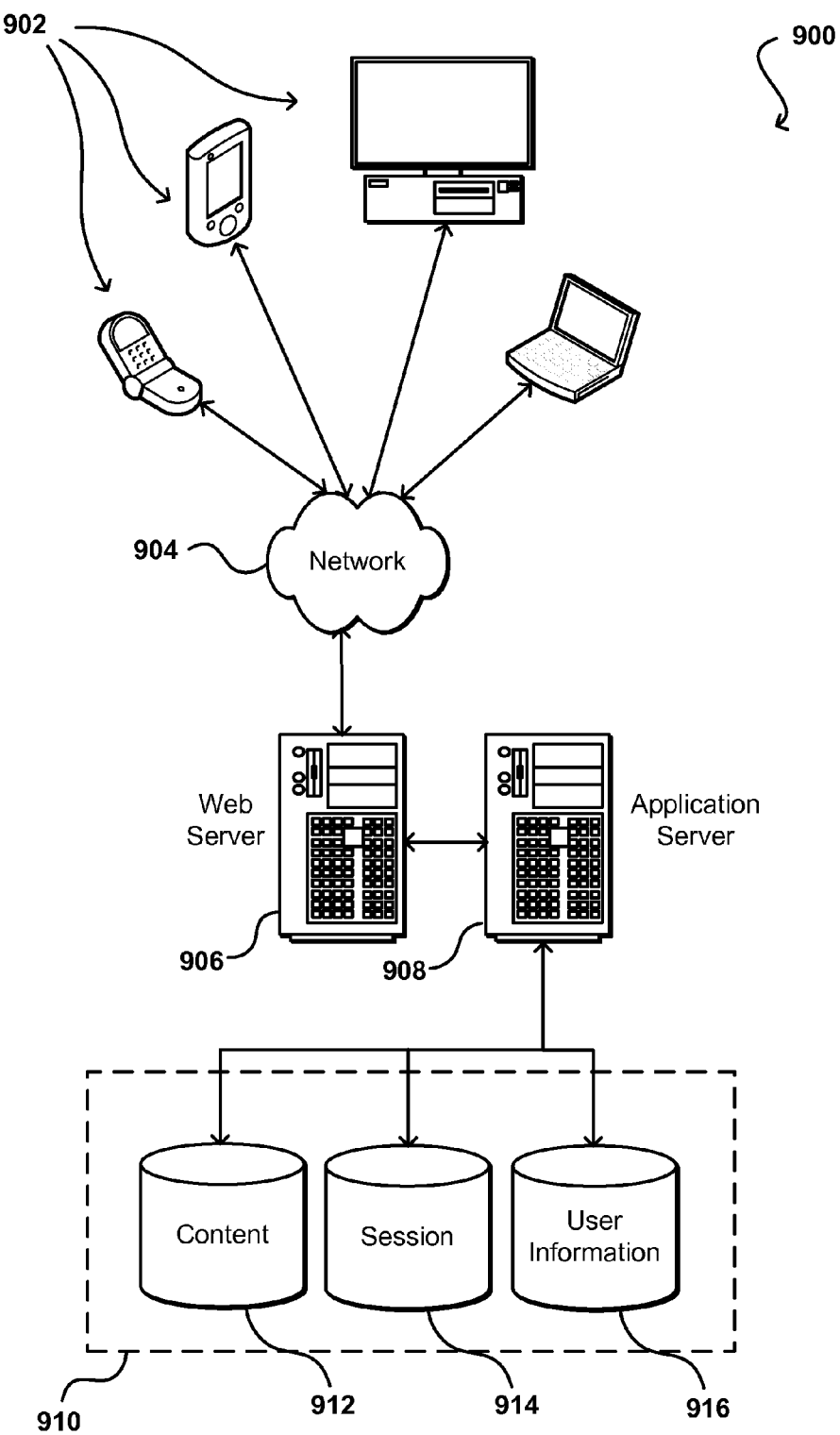
FIG. 9 illustrates an example environment in which various implementations may be performed.

As discussed, different approaches can be implemented in various environments in accordance with the described implementations. For example, FIG. 9 illustrates an example of an environment 900 for implementing aspects in accordance with various implementations. As will be appreciated, although a Web-based environment is used for purposes of explanation, different environments may be used, as appropriate, to perform various implementations. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network 904 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side and also provide access patterns to different devices to allow users to obtain access to common components across multiple devices 902. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allows the server to perform its intended functions. Suitable implementations for the operating system and general functionality of the servers are known or commercially available and are readily implemented by persons having ordinary skill in the art, particularly in light of the disclosure herein.

The environment in one implementation is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various implementations can be further implemented in a wide variety of operating environments, which in some cases can include one or more user computers or computing devices which can be used to operate any number of applications. User or client devices can include any number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Some implementations utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network or any combination thereof.

In implementations utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate implementations may have numerous variations from that described above. For example, customized hardware might also be used and/or particular elements might be implemented in hardware, software (including portable software, such as applets) or both. Further, connection to other computing devices such as network input/output devices, may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information. This may include computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to provide the various implementations.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for controlling access to a device, comprising:
    under control of one or more computing systems configured with executable instructions, receiving a device access request;
    displaying, by a display of the device, a first orientation of a three-dimensional representation of an object;
    receiving a first input when the first orientation of the three-dimensional representation is displayed, wherein the first input represents a continuous motion that corresponds to a sequence of specific coordinates of the three-dimensional representation of the object;
    displaying, by the display, a second orientation of the three-dimensional representation of the object;
    receiving a second input when the second orientation of the three-dimensional representation is displayed;
    determining an input pattern based at least in part on: the first orientation, the first input, the second orientation, and the second input;
    determining that the input pattern corresponds with a stored access pattern; and
    providing access to the device.

2. The computer-implemented method of claim 1, wherein the three-dimensional representation of the object is a three-dimensional representation of a cube; and wherein at least three sides of the three-dimensional representation of the cube are visible on the display.

3. The computer-implemented method of claim 2, wherein the display is a touch-based display.

4. The computer-implemented method of claim 1, wherein the input pattern is further based on at least a signal received from at least one of: a touch-based input component, an accelerometer, a gyroscope, an inertial sensor, a pressure sensor, a microphone, a barometer, a global positioning system, or a compass.

5. The computer-implemented method of claim 1, wherein the input pattern is further based on at least a signal received from at least a camera, and wherein the camera captures images used to determine at least one of gaze tracking, head tracking, facial recognition, feature tracking, expression recognition, or light detection.

6. The computer-implemented method of claim 1, further comprising:
    detecting a time delay between the first input and the second input.

7. The computer-implemented method of claim 6, further comprising:
    determining that the time delay corresponds with a time delay of the stored access pattern.

8. The computer-implemented method of claim 1, further comprising:
    identifying a user of the device; and
    determining that at least one of a start position of the first input or a start position of the second input corresponds with a point on the object,
    wherein at least one of the specific coordinates is a position (x, y, z) on the three-dimensional representation of the object.

9. A non-transitory computer-readable storage medium storing instructions for controlling access to at least one application of a device, the instructions when executed by one or more processors cause the one or more processors to at least:
    receive a device access request;
    provide for display two or more orientations of a three-dimensional representation of an object;
    receive an input to a touch-based display of the device, the input corresponding to at least one of the displayed orientations;
    determine a first input pattern based at least in part on the one or more displayed orientations and the input to the touch-based display, wherein the input represents a continuous motion that corresponds to a sequence of specific coordinates of the three-dimensional representation of the object;
    determine a second input pattern based at least in part on a second input received at a second input component of the device that is distinct from the touch-based display of the device;
    determine that the first input pattern and the second input pattern correspond with a stored access pattern; and
    provide access to at least one application of the device in response to determining that the first input pattern and the second input pattern correspond with the stored access pattern.

10. The non-transitory computer-readable storage medium of claim 9, wherein the instructions when executed by the one or more processors further cause the one or more processors to at least:
    verify the first input pattern and the second input pattern.

11. The non-transitory computer-readable storage medium of claim 9, wherein at least a portion of the first input and at least a portion of the second input are received in parallel.

12. The non-transitory computer-readable storage medium of claim 9, wherein the stored access pattern requires that the first input pattern and the second input pattern be received in a specific order.

13. The non-transitory computer-readable storage medium of claim 9, wherein the first input pattern is further based at least in part on a signal provided by a third input component, the third input component including at least one of a touch-based display, a camera, an accelerometer, a gyroscope, an inertial sensor, a pressure sensor, a microphone, a barometer, a global positioning system, or a compass.

14. The non-transitory computer readable storage medium of claim 9, the instructions when executed by the one or more processors further cause the one or more processors to at least:
    determine device access privileges; and
    wherein providing access to at least one application of the device is according to the device access privileges.

15. The non-transitory computer-readable storage medium of claim 9, wherein the instructions when executed by the one or more processors further cause the one or more processors to at least:
    identify at least one application associated with the stored access pattern; and
    provide access to the at least one application.

16. The non-transitory computer-readable storage medium of claim 9, the instructions when executed by the one or more processors cause the one or more processors to at least:
    determine whether a third input pattern is required by the stored access pattern prior to providing access to the at least one application.

17. The non-transitory computer-readable storage medium of claim 16, wherein the third input pattern includes a facial recognition of a user.

18. The non-transitory computer-readable storage medium of claim 16, wherein the third input pattern includes a biometric identification of a user.

19. A computing system, comprising:
one or more processors; and
a memory coupled to the one or more processors and storing program instructions that when executed by the one or more processors cause the one or more processors to at least:
send for display at least two orientations of a three-dimensional representation of an object;
determine at least one input pattern, wherein the at least one input pattern is based at least in part on:
a first input received during a first display of a first orientation of the three-dimensional representation of the object, wherein the first input represents a continuous motion that corresponds to a sequence of specific coordinates of the three-dimensional representation of the object; and
a second input received during a second display of a second orientation of the three-dimensional representation of the object;
determine that the at least one input pattern corresponds with a stored access pattern; and
provide access to at least one application of a device.

20. The computing system of claim 19, wherein a display of the three-dimensional representation of the object changes from the first orientation to the second orientation while a portion of the first input is received.

21. The computing system of claim 19, wherein the program instructions that when executed by the one or more processors further cause the one or more processors to at least:
send for display an animated rotation of the three-dimensional representation of the object.

22. The computing system of claim 19, wherein the at least one input pattern is further based at least in part on a signal provided by an accelerometer.

23. The computing system of claim 19, wherein the at least one input pattern is further based at least in part on a signal provided by an image capture device that captures a gaze of a user.

24. The computing system of claim 19, wherein the at least one input pattern is further based at least in part on a signal provided by an image capture device, and wherein the at least one input pattern is further based at least in part on a head position of a user.

25. The computer-implemented method of claim 1, wherein the at least one first input includes a point, and wherein determining the input pattern includes:
associating the point with the first input; and
determining at least one of the specific coordinates by ray casting based at least in part on the point and the first orientation of the three-dimensional representation of the object.

26. The computer-implemented method of claim 25, wherein the point indicates a position where a user is looking, and wherein determining at least one of the specific coordinates by ray casting is further based at least in part on a direction extending from the user to the display.

27. The computer-implemented method of claim 25, wherein the point indicates a position of a head of a user, and wherein determining the at least one of specific coordinates by ray casting is further based at least in part on a direction extending from the user to the display.

28. The computer-implemented method of claim 25, wherein the point indicates where a user is touching the display.

29. The computer-implemented method of claim 1, wherein determining the input pattern is further based at least in part on a time that the first input was received and a second time that the second input was received.

30. The computer-implemented method of claim 1, further comprising:
switching from displaying the first orientation to the second orientation in response to the first input being received.

* * * * *